Figures 1, 2, 23:
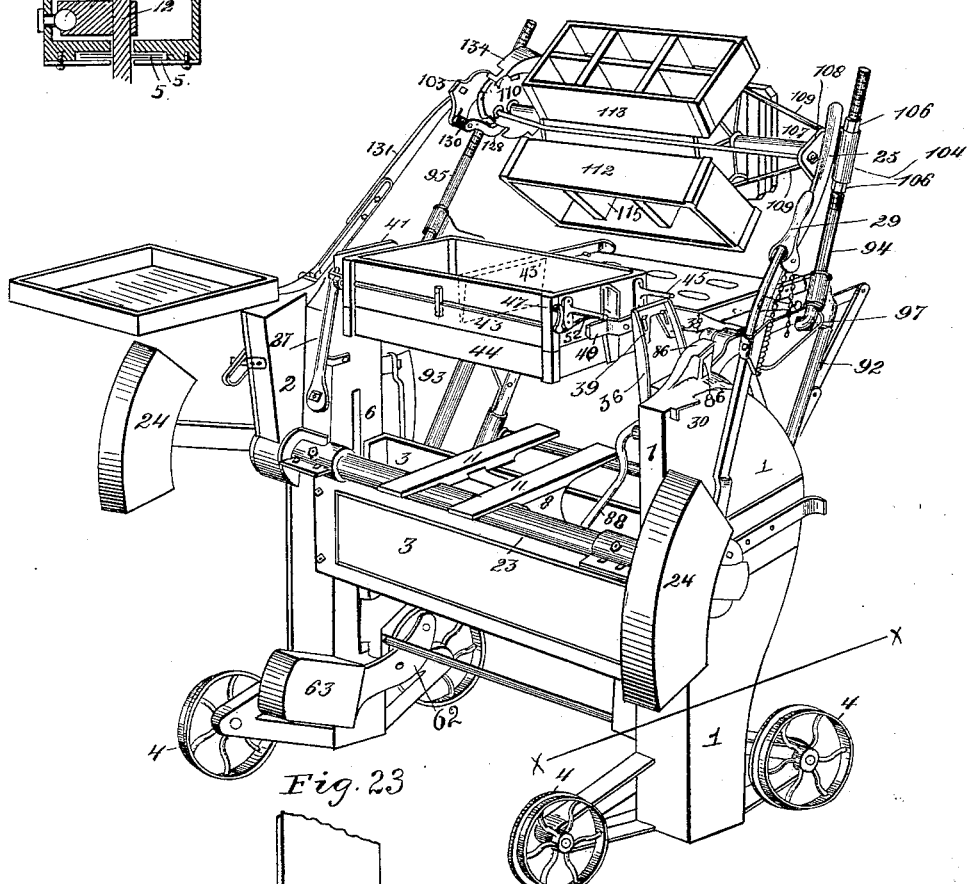

No. 618,080.                                                    Patented Jan. 24, 1899.
F. O. FARWELL.
MOLDING MACHINE.
(Application filed Sept. 16, 1895.)

(No Model.)                                                     10 Sheets—Sheet 1.

Attest.
Arthur A. Erb.
John L. Ouellette.

Inventor.
Hay O. Farwell
by
M. M. Cody
Atty.

No. 618,080. Patented Jan. 24, 1899.
F. O. FARWELL.
MOLDING MACHINE.
(Application filed Sept. 16, 1895.)
(No Model.) 10 Sheets—Sheet 2.
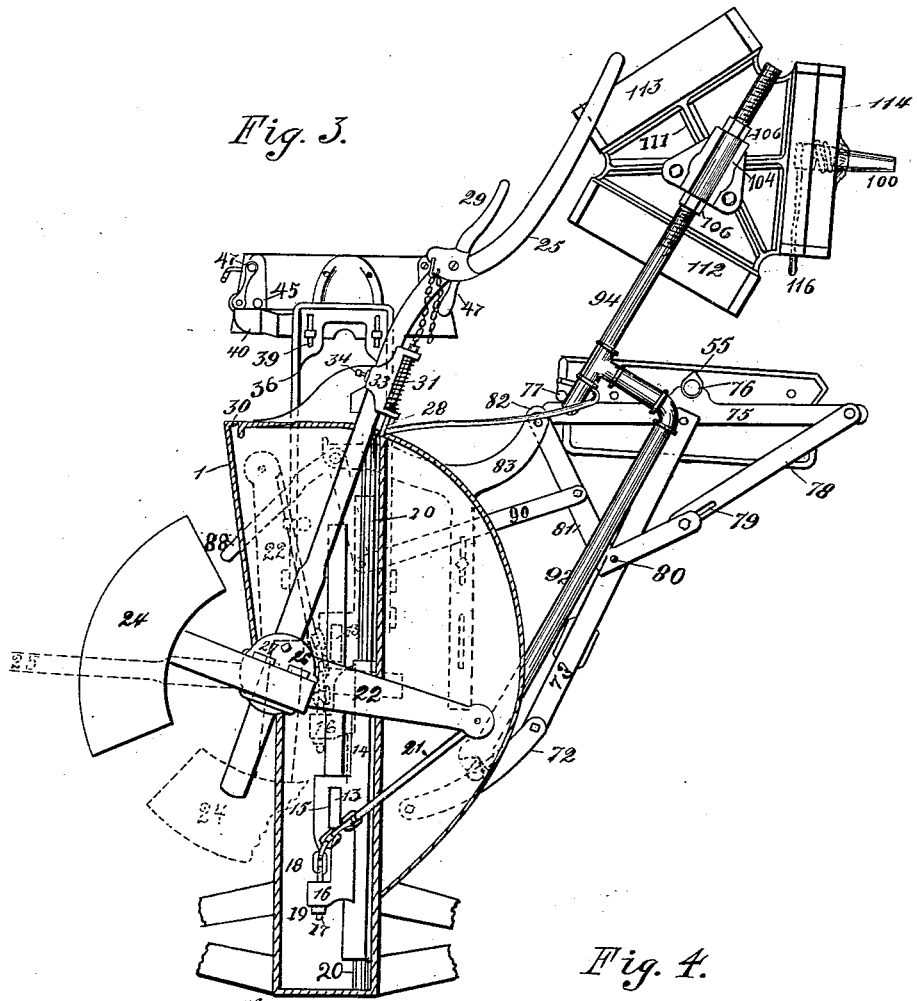
Fig. 3.
Fig. 4.
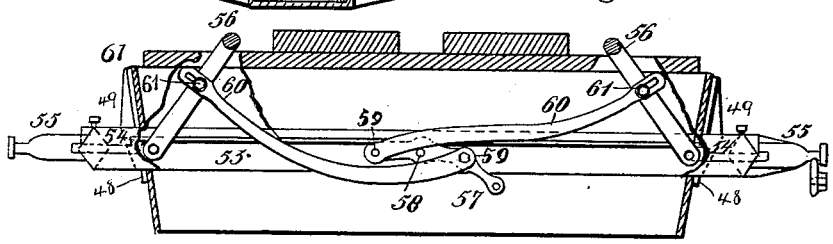
Attest:
Arthur A. Erb.
John L. Picettel.
Inventor:
Fay O. Farwell
by
M. M. Cady atty.

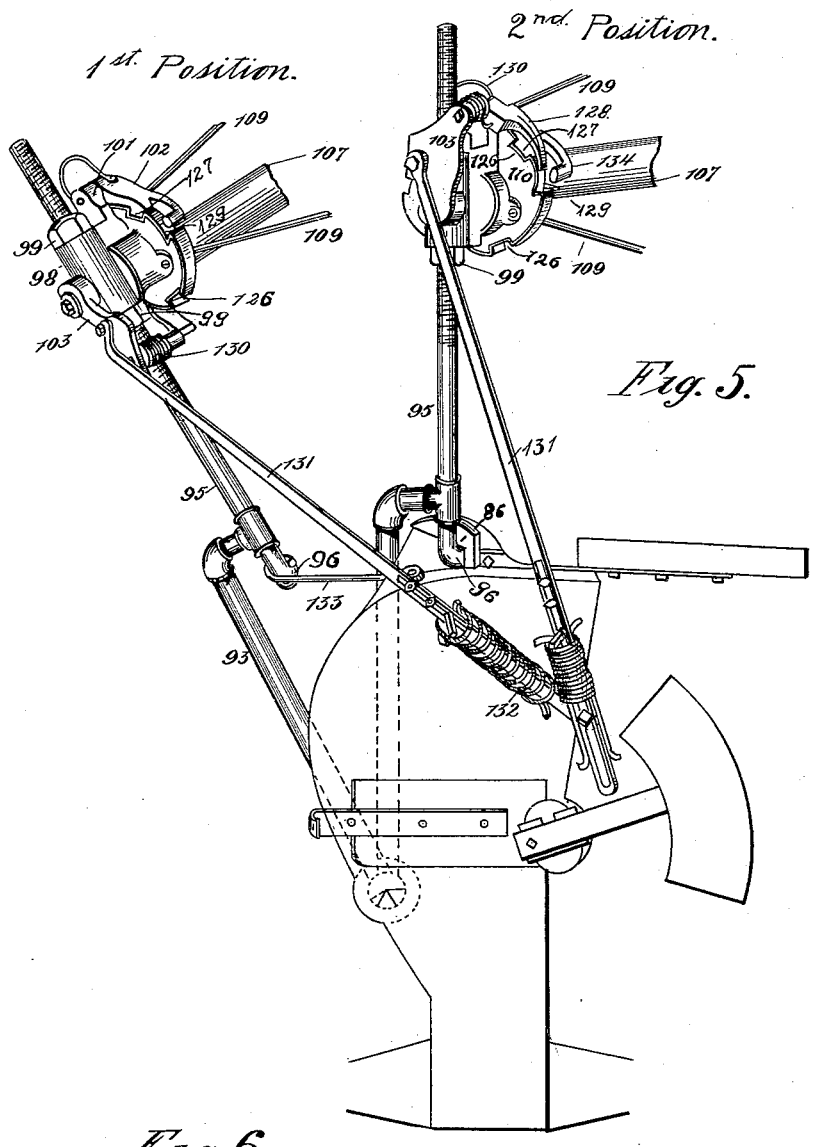

No. 618,080. Patented Jan. 24, 1899.
F. O. FARWELL.
MOLDING MACHINE.
(Application filed Sept. 16, 1895.)

(No Model.) 10 Sheets—Sheet 4.

Attest:
Arthur A. Herb.
John L. Puettell.

Inventor:
Fay O. Farwell
by
M. M. Cady
Atty.

THE NORRIS PETERS CO., PHOTO-LITHO., WASHINGTON, D. C.

No. 618,080. Patented Jan. 24, 1899.
F. O. FARWELL.
MOLDING MACHINE.
(Application filed Sept. 16, 1895.)
(No Model.) 10 Sheets—Sheet 5.
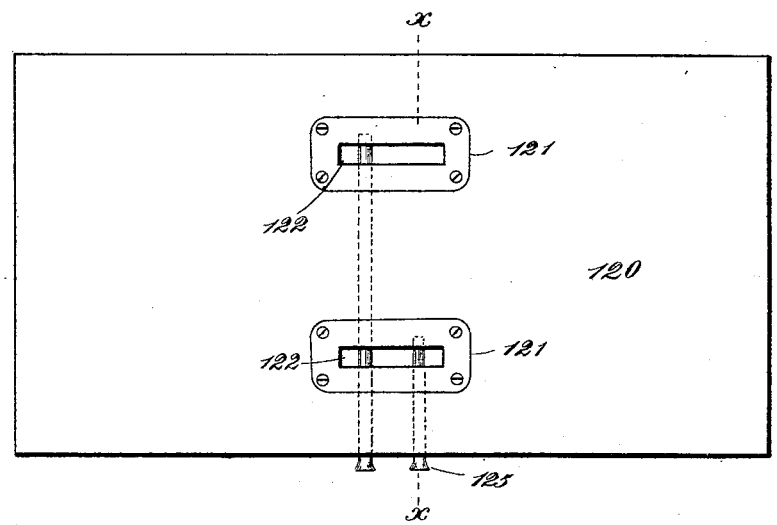
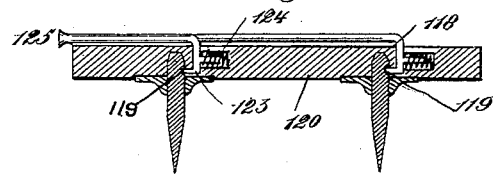
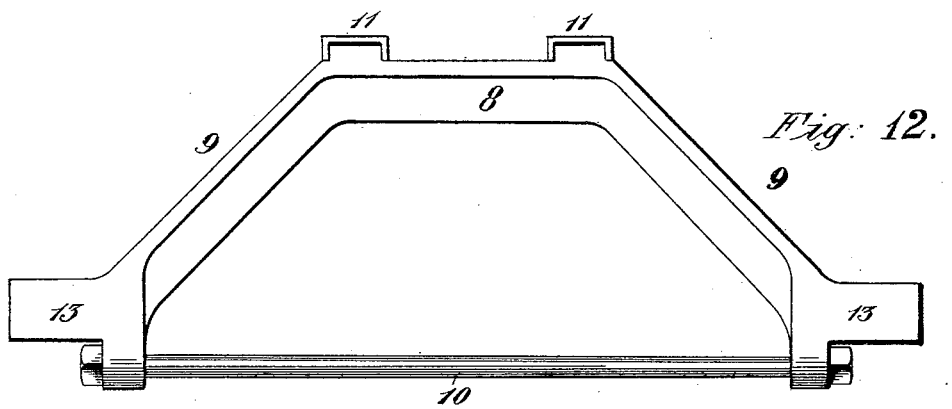

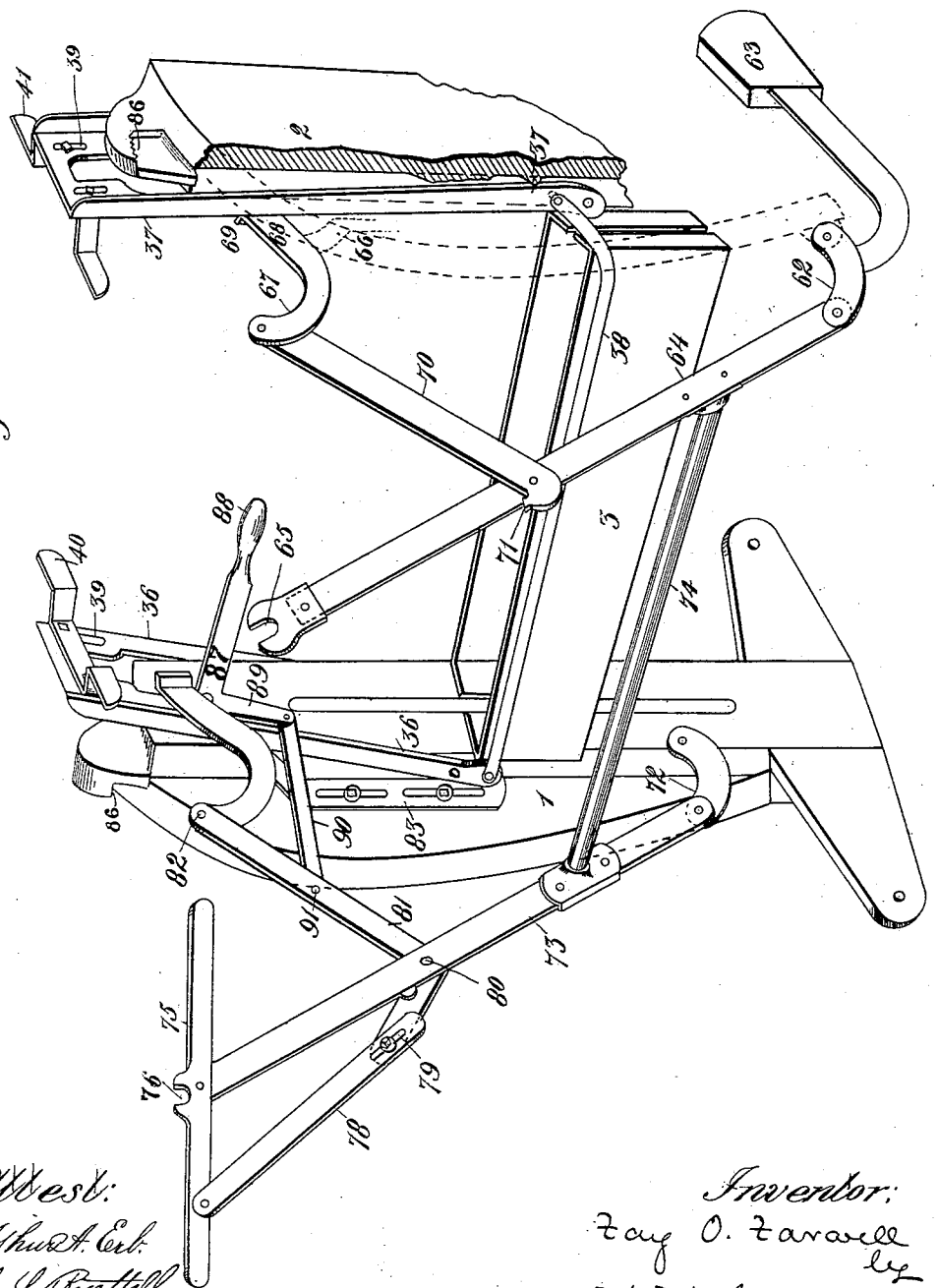

No. 618,080. Patented Jan. 24, 1899.
F. O. FARWELL.
MOLDING MACHINE.
(Application filed Sept. 16, 1895.)
(No Model.) 10 Sheets—Sheet 7.
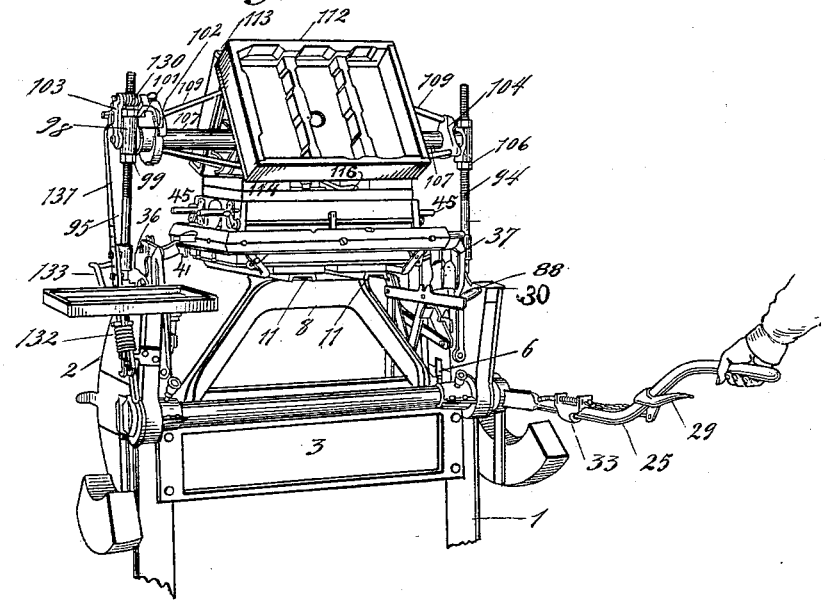
Fig. 16.
Fig. 15.
Fig. 14.
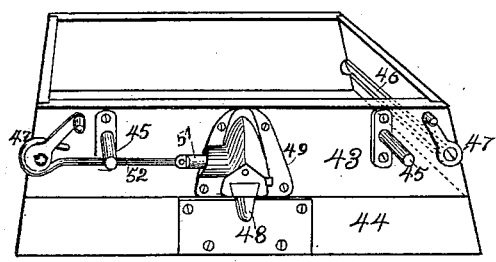
Fig. 24.
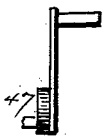
Attest.
John L. Buettell
J. E. Rosser
Inventor.
Fay O. Farwell
by
M. M. Cady
Atty.

No. 618,080. Patented Jan. 24, 1899.
F. O. FARWELL.
MOLDING MACHINE.
(Application filed Sept. 16, 1895.)

(No Model.) 10 Sheets—Sheet 8.

No. 618,080. Patented Jan. 24, 1899.
F. O. FARWELL.
MOLDING MACHINE.
(Application filed Sept. 16, 1895.)
(No Model.) 10 Sheets—Sheet 9.

No. 618,080. Patented Jan. 24, 1899.
F. O. FARWELL.
MOLDING MACHINE.
(Application filed Sept. 16, 1895.)
(No Model.) 10 Sheets—Sheet 10.

UNITED STATES PATENT OFFICE.

FAY O. FARWELL, OF DUBUQUE, IOWA, ASSIGNOR OF ONE-HALF TO THE ADAMS COMPANY, OF SAME PLACE.

MOLDING-MACHINE.

SPECIFICATION forming part of Letters Patent No. 618,080, dated January 24, 1899.

Application filed September 16, 1895. Serial No. 562,704. (No model.)

*To all whom it may concern:*

Be it known that I, FAY O. FARWELL, a citizen of the United States, residing in the city and county of Dubuque and State of Iowa, have invented certain new and useful Improvements in Molding-Machines; and I do hereby declare the following to be a full, clear, and exact description of the invention, such as will enable others skilled in the art to which it appertains to make and use the same.

In the preparation of molds for metal castings of that character known as "snap-molds," or those from which the flask is removed after the mold is finished, it has been found necessary to compress the sand around the edge of the flask densely to prevent the sides of the mold from bursting out or disintegrating when the melted metal is poured into them. Again, it is essential that the sand through the center of the flask should vary in density according to the shape and character of the pattern. Certain kinds of work, like pulley-wheels, require that the sand be rammed or compressed firmly around the pattern on the lower side, where the pressure of the molten metal is greater, while on the upper side, in the center, the sand must be compressed much less to allow the gas and air to escape when the metal is poured into the mold. Again, in molding thin flat surfaces it has been found that the metal does not lie or run smoothly upon the surface that is too hard or dense, and therefore the lower part of such molds should be very soft under the pattern, but sufficiently hard around the edge of the pattern, and the cope or upper part of the mold should be much harder than the drag or lower part. Again, the turning of the flask over after the lower part has been rammed or compressed, the lifting of the cope or upper part of the flask from the pattern and from the lower part of the flask, the drawing of the pattern from the sand, and the closing of the mold and the taking of the flask therefrom all require not only considerable physical exertion, but great skill, acquired only by long practice.

In most of the machines now in use for molding the pressure is largely bestowed over the surface of the whole flask, and this varies according to the amount of sand in the flask. If there be any parts which require that the sand be more densely compressed, the operator rams or compresses such parts by hand with the aid of the usual peens. This is always the same whether the molding-machine be of a class in which the pattern projects through holes in the plate, which conform to the shape of the outside of the pattern, or otherwise, and the compressing or ramming of the different parts is accomplished by hand independent of the machine.

In most of the machines upon the market the turning of the mold over, opening the mold, drawing the pattern, closing the mold, and removing the flask are done by the operator without aid of the machine. Again, the mechanism used for compressing the sand into the mold in these machines is by what is called an "elbow" or "toggle" joint, which gives great leverage as the links approach the dead-center, and the pressure upon the sand will vary according to the thickness of the bottom board or the amount of sand in the flask with the same amount of force exerted upon the lever. Hence it is very difficult to compress the sand in different molds to the same density by any of the machines now in use. When the patterns have upon them studs, pins, or other projections extending some distance into the mold, if the operator compresses the sand around the outer edge by means of ramming it with the hand-peen the partly-compressed sand will be driven away from the opposite side of the projection, and it will be found that the projections upon the castings produced from such molds will be much larger than they should be and the casting will be worthless. Often the sprue-holes, or holes through which the metal is poured into the mold, vary in size and shape, according to the pattern used, and it has been usual in hand-molding to set pins of the required shape in the mold and draw them out by hand after the sand had been rammed, and in machine-molding the operator usually forces into the mold a tapering tube after the sand has been pressed into the mold. To overcome these various difficulties in a way of successfully molding by machine, whereby there shall be the least waste of castings and still complete the molding entire with but a slight physical exertion on the part of the operator and little or no molder's skill, is the object of my invention.

Figure 7:
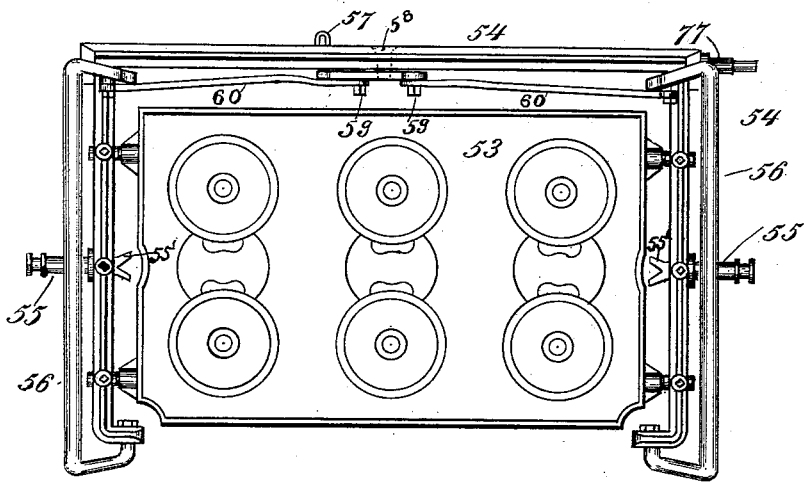
Figure 8:
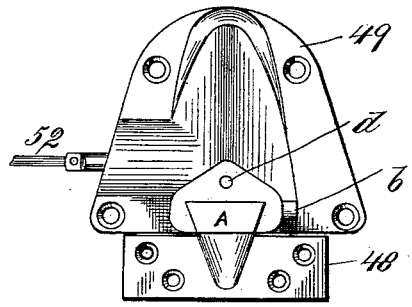
Figure 9:
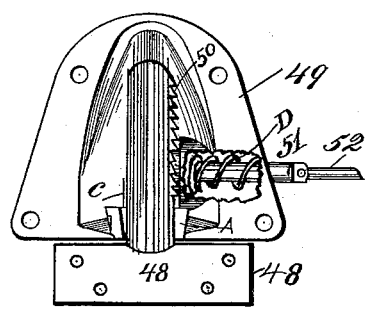

Figure 1 is a perspective of the machine, showing the flask, pattern-plate, lever, table, &c., in the position to commence making a mold. Fig. 2 is a section through line X X of Fig. 1. Fig. 3 is a right end elevation with the casing removed from the standard. Fig. 4 is a front elevation of the pattern-frame with the two parts of the flask cut away, showing the mechanism for holding bottom board in position. Fig. 5 is a left end view showing presser-bar-rotating mechanism in two different positions. Fig. 6 is a sectional view of the presser-head, showing tubular sprue-cutter in position. Fig. 7 is a top view of the pattern-plate and frame with patterns on the plate. Fig. 8 is a front view of one of the flask ears or sockets. Fig. 9 is a rear view of Fig. 8, showing mechanism for locking the two parts of the flask. Fig. 10 is a bottom view of presser-head, showing flat sprue-sockets. Fig. 11 is a section of Fig. 10 on the line X X with flat sprues in the sockets. Fig. 12 is a side elevation of the supporting-truss of the table. Fig. 13 is a perspective rear view of the machine with the pattern-plate, presser-head, and other attachments removed and with part of one of the standards cut away. Fig. 14 is a perspective of the flask, showing the retaining-ribs and the manner of locking the two parts of the flask together. Fig. 15 is a section of one side of Fig. 14, showing the retaining-rib rotated into the flask. Figs. 16, 17, 18, 19, 20, 21, and 22 are perspectives of the machine, showing the different positions the machine assumes while completing a mold. Fig. 23 is a detail view of the plates 5 5'.

Like figures and letters of reference denote corresponding parts in all of the drawings.

The frame of my improved molding-machine consists of two upright standards 1 and 2, secured together by the cross panels or stays 3 3, and the whole mounted on wheels 4 4, all shown in Fig. 1. On the inner side of each of the standards 1 and 2 is a perpendicular slot 6, in which the bed-frame or truss 8, which carries the table, is guided in its vertical movements. Covering these slots 6 are flat shields 5, (shown in Fig. 2,) which slide or telescope one behind the other when the table is raised or lowered and which serve to prevent the sand from sifting into the guides and mechanism contained in the standard. The truss 8 consists of a curved bar of iron, (shown in Fig. 12,) with strengthening-ribs 9 9 upon both upper edges and a cross-rod 10, connecting the two lower ends of the frame 8. To the upper side of 8 are bolted the two bars 11 11, forming the table of the machine. The outer ends of the truss 8 each terminates in a flat projection, forming tenon 13, and project out into each of the standards 1 and 2, the object of which will presently appear.

For the purpose of raising and lowering the table 11 there is secured on the outer side of the standard 1, but inclosed in a metal box to protect it from dust and sand, a slide 14, (shown in Fig. 3,) having a mortise 15, into which projects the tenon 13 of the truss 8. Near the lower end of 14 is a lug 16 with a hole through its center, through which a bolt 17, with link or chain 18 attached, is inserted and held by the nut 19. A groove on one side of the slide 14 partially encircles a bar 20, fixed in the outer side of the standard 1 and serves to guide the slide in its vertical movements. To the links 18 is fastened one end of a long link 21, the outer end of which link is pivoted to the rocker-shaft arm 22 of the lifting-lever. The arm 22 is rigidly fixed on one end of the rocker-shaft 23. To the hub 26 of the arm 22 is also attached a counterbalance-weight 24. Within a metallic box on the outer side of standard 2 are arranged duplicates of 13, 14, 15, 16, 17, 18, 19, 20, 21, 22, and 24, respectively, which are connected together by the shaft 23 and operated by a common lever in order that the table may be always raised and lowered in a vertical plane. To the outer end of the rocker-shaft 23, upon the outside of the standard 1, is fixed an operating-lever 25 by passing it through the mortise in the hub 26 of the arm 22 and securing it by a set-screw 27. The object of having the lever adjustable to different lengths is to provide for the weight of different operators.

It will be here remembered that these machines may quite frequently be used by workmen who are not sufficiently skilled in the art of molding to understand how dense it is necessary to compress the sand in the flask, and if the lever be adjusted according to the weight of the operator and the size of the flask used he will not be required to exercise any skill, but he will at all times simply throw his entire weight upon the lever, and the sand will be properly compressed by this operation and always alike. The operating-lever 25 carries a pawl 28, which is operated by a hand-latch 29 for bringing the pawl into engagement with the stop 30 in the upper edge of the standard 1, where it is held in engagement with said stop 30 by a spring 31 and is operated by said hand-latch 29. The pawl 28 is held in the frame 33 and made adjustable upon the lever 25 by a set-screw 34 in order to adapt the pawl to engagement with the stop 30 at all times whatever be the length to which the lever is set. It will here be seen that by this arrangement of mechanism for raising the table when the lever 25 is thrown toward the front of the machine the table will be at first carried up very rapidly from the fact that the slide 14 and its duplicate are attached to the outer ends of the arms 22 by the links 21, and as the lever 25 is brought forward the ends of the arms 22 travel very rapidly, carrying with them the table. Then as the arm 22, with its duplicate, approaches a perpendicular or parallel with the slides 14 the straps 21 are brought parallel and close against the arm 22, and the chains 18 by a further movement downward of the lever 25 will wrap around the hubs 26. At this point it will be seen that the speed of the table has been greatly slackened; but the power exerted upon the table will be increased many fold, and the same power is maintained throughout the further downward movement of the lever 25. This is of the utmost importance, as the peening and compressing of the sand are always accomplished when the table is just approaching to and in its highest position, at which time the chains are being wrapped around the hubs, and by this arrangement the same pressure will be transmitted to the sand in the flask whether there be little or much, and thus at all times when the lever is properly adjusted to the weight of the operator the compressing of the sand will be always alike and there will be no danger of loss of casting from improper compression of the sand.

To the inner side of the standards 1 and 2 are pivoted supports 36 and 37. (Shown in Figs. 1, 3, and 13.) At the inner upper end of 36 is adjustably fastened by bolts through the slots 39 (shown in Fig. 3) a plate 40, and a similar plate 41 is adjustably secured to the support 37 for the purpose of sustaining the flask and its different parts during the successive stages of its operations in molding. The two supports 36 37 are pivotally connected together in the rear of the machine by the connecting-bar 38 in order that both supports may swing in or out in unison. (Shown in Fig. 13.)

The flask shown in Fig. 14 consists of two parts—the cope 43 and the drag 44—and tapers inwardly from the base of the drag to the top of the cope for allowing the mold to be more readily withdrawn by an operation presently to be described.

When it is desired to have a very large flask, it is often impracticable to press the sand in the cope sufficiently hard to bridge over the flask and prevent the mold from caving down when the pattern is withdrawn. In such case I use a tapering bar 43', (shown in dotted line in Fig. 1,) which is fitted crosswise in the cope of the mold and of wedge shape, much thicker at the top than at the bottom. This will relieve the necessity of any overpressure on the sand in the cope, as this partition will form a support for the central part of the mold. The object of making the partition wedge shape is the same as before given for making the flask tapering. At the outer ends of the cope 43 are fixed horizontal bars 45, which project out from the cope and rest on the plates 40 41 at certain periods of the operation. Running lengthwise of the cope 43, upon each side, is a rib 46, (shown in Figs. 14 and 15,) which is operated by the cranks 47 to turn these ribs into the cope to retain the sand therein or to turn them flush with the inner side of the cope to allow the mold to be withdrawn from the flask. To each end of the drag 44 is secured a standard or pin 48, which projects up above the drag 44 and into sockets 49, secured to the ends of the cope 43, as shown in Figs. 8 and 9. The socket 49 (shown in Figs. 8 and 9) consists of a hood with a flange and a hole to enable it to be secured to the end of the flask. Near the open end of the hood is a forked block A, adjustably secured by the set-screw b. The object of this block is to form a guide for the pin 48 as it enters the hood, and the wear is compensated for by being adjustable. Just above the block A are openings, into which pads of felt c or other absorbent material are fitted in such a way that they come in contact with the pin 48 as it enters the socket. These pads c are saturated with oil through the hole d, thus forming a lubricant for the pin each time it enters the socket. One side of each pin 48 is roughened or notched at 50 to engage with the pawl 51, projecting into the socket 49, which pawls are withdrawn from and brought into engagement with the notches on the pin 48 by their connection with spring D and rod 52, operated by a crank 47, the hub of the crank 47 being in the form of an eccentric. The object of this arrangement is to hold the cope and drag of the flask together when necessary.

Figure 20:
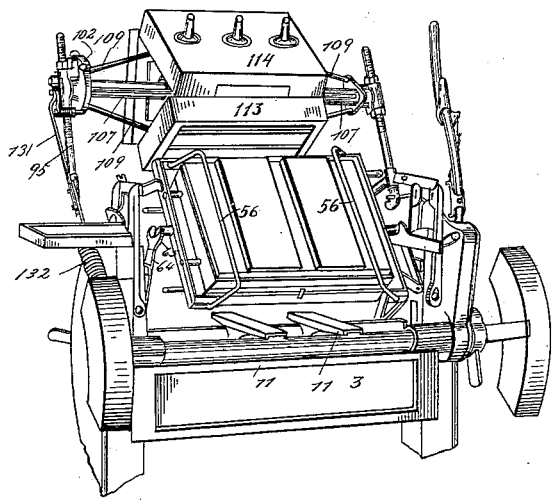
Figure 21:
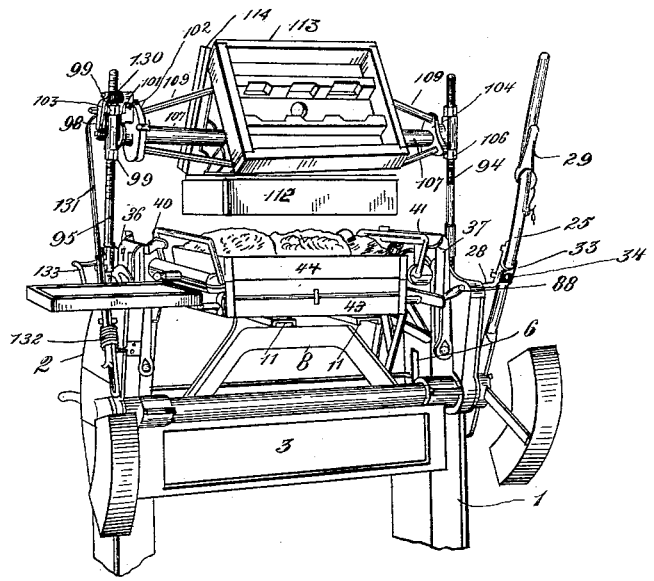

The patterns used with my machine are secured to both sides of the plate 53, which is set in a frame 54, (shown in Figs. 4 and 7,) having trunnions 55 at each end, on which the whole revolves. The outer ends of the trunnions 55 serve to support the flask and the frame, as shown in Fig. 4, and the inner ends 55' serve to support the flask itself. Pivoted at each end of the frame 54 is a clamp or loop 56, which may be swung over the drag after it is filled with sand and bottom board put on to keep the sand in the drag while it is turned over to fill the cope, as shown in Figs. 4 and 20. The loops 56 are operated by the lever 57, Figs. 4 and 7, pivoted at 58 near its center and to the center of one side of the frame 54. At equal distance therefrom, upon each side of the pivot of said lever, are pivoted at 59 the arms 60, which arms 60 are adjustably pivoted at 61 at their outer ends to the loops 56, thereby to allow for the different widths of drag or different thickness of bottom board. In order to automatically lock the loops 56 to prevent any displacement when the flask is turned, the pivots 59, 58, and 61 of each of the arms 60 are placed in a straight line or dead-center when the lever is locked.

The mechanism whereby the pattern and pattern-plate are operated consists of an arm 62, pivoted to the inner side of the standard 2 near its base. (Shown in Fig. 13.) To the arm 62 is fixed a weight 63. To the outer end of the arm 62 is pivoted another arm 64, having its upper end formed into a crotch or open-top bearing 65, in which a trunnion of the pattern-frame rests or revolves. Against the inner side of the standard 2, near the top, is adjustably fastened a plate 66, having the two arms 67 68, the arm 68 terminating in a right-angle bend or catch 69 to limit the forward travel of the arm 64. A strap 70, carrying a catch 71 to limit the backward travel of the arm 64, is pivoted at one end to the arm 67 and at its other end to nearly the center of the arm 64. To the base of the standard 1 (see Figs. 3 and 13) is also pivoted an arm 72 for the same purpose as the arm 62, and to it is pivoted the arm 73, similar to 64, with which it is connected by the stay-rod 74. To the upper end of the arm 73 is pivoted, near its center, a cross-plate 75, having a crotch or open-top bearing 76 to receive the other trunnion of the pattern-frame. This plate 75 extends on both sides of the crotch 76 sufficient to engage the pin 77, projecting from one corner of the pattern-frame. (See Fig. 7.) It will be seen by this mode of construction that the frame is prevented from turning more than one-half revolution by the pin 77 coming in contact with the plate 75, as it would be liable to do on account of the added weight of the lever 57 and appliances connected with said lever on that side of the flask, and it is of the utmost importance that the pattern-plate be held in a horizontal plane and prevented from turning when the pattern is being drawn from the drag. The arms 64 and 73 being rigidly connected together by the rod 74, the crotches 65 and 76 will travel in unison and in substantially the same horizontal plane, and the weight 63 is intended to just counterbalance the weight of all the appliances for moving the pattern-frame, so that it will stay at the extremities of its movement either forward or backward. Near the rear end of the plate 75 is pivoted an arm 78, the lower end of 78 being adjustably pivoted in a slot 79 to the short end of the angle-plate 81, whereby the rear end of the plate 75 may be adjusted to the required height. An angle-plate 81 is pivoted at 82 to the arm of a plate 83, and also said plate is pivoted to the arm 73 by the bolt 80. Against the inner side of the standard 1 is adjustably secured a plate 83, similar in purpose and in form to the plate 66. To the forward arm of the plate 83 is pivoted the angle-lever 87, having the handle 88 and the angle-arm 89, to the outer end of which arm 89 is pivoted a strap 90, which runs back and is pivoted at its outer end to the angle-plate 81 at 91. It will now be understood that by this mechanism for operating the pattern-frame when the hand-lever 88 is raised the frame carrying the pattern-plate will be brought forward between the cope and drag of the flask in substantially a horizontal plane, and when the lever is lowered the pattern will be withdrawn from between the different parts of the flask, always traveling in the same horizontal plane.

The devices for compressing the sand in a novel manner and the mode of operating the same will now be described. Referring to Figs. 1, 3, and 5, two uprights 92 and 93 are rigidly secured together at their base by a cross-bar (not shown) and pivoted with the cross-bar to the inner side of the two standards 1 and 2, near the base of said standards. These uprights 92 and 93 are preferably bent at their upper ends and formed into a ring or clasp for holding other uprights 94 and 95, which uprights are respectively formed at each of their lower ends into hooks 97 and 96. The object will presently appear. Around the upper end of upright 95 is a sleeve 98, (see Fig. 5,) adjustably secured on the upright 95 by the lock-nuts 99 and carrying a pin or gudgeon and having an ear 101, to which a pawl 102 is pivoted. A side elevation of said sleeve 98, with the pawl 102, is shown in Fig. 5. Upon the outer side of the sleeve 98 is pivoted a crank-arm 103, carrying a pawl, presently to be described. Around the upper end of the upright 94 is another sleeve 104, similar to the sleeve 98, also carrying a pin or gudgeon, but no pawls. This sleeve is also adjustably secured to the upright 94 by the lock-nuts 106. (See Figs. 1 and 3.) Between the sleeves 98 and 104 and capable of revolution upon the pins projecting toward each other from the sleeves is a shaft 107, terminating in a head 108. (Shown in Fig. 1.) The head 108 has three projections or ears, with holes through the same, in which the three girders 109 are held by lock-nuts. At the opposite end of the shaft is also a head 110, and the girders 109 are screw-threaded into the same. Rigidly secured to the shaft 107 is a triangular plate 111, Fig. 3, carrying upon its three sides the compressing-heads 112 113 and the presser-head 114. It is manifest that there may be added other heads, as many as are necessary, but three are all that would usually be required. Head 112 is an ordinary box consisting of four boards of considerable thickness for the purpose of compressing the sand around the inner edges of the flask and is made of just the size to be easily pressed into the flask, the object being to compress or peen the sand very densely around the outer edges of the mold next to the flask. If the mold be large or it is desired to compress the sand densely at other places than around the outside, cross-bars 115 may be placed in the center of the frame 112, as shown in Fig. 1. Head 113 is made with partitions upon the inside for the purpose of compressing the sand at different places between the patterns in the mold. A view of head 113 is shown in Fig. 1. The presser-head 114 consists of a flat board, through which are secured sprues or sprue-cutters 100 (shown in Figs. 3 and 6) for cutting the sprue-holes in the cope through which the liquid metal is poured into the mold. It will be noticed that when the flask is provided with the partition 43' the peening-head 113 and the presser-head 114 would of necessity be divided to press the sand on both sides of the partition in the flask. As it is difficult and often impossible to press these sprue-cutters down through the cope to the patterns by direct pressure provision is made for partially rotating them. This is accomplished by a lever 116, attached to the upper end of the sprue-cutters, with the arms 117 surrounding the sprue-cutters 100, and when the sprue-cutters are being forced into the sand by turning the lever 116 to the right or left and partially rotating said cutters they will more readily cut their way through the sand down to the pattern while under pressure.

When sprues other than round are to be used, the sprue is provided, as shown in Figs. 10 and 11, with the head 118, in which is a notch 119. The presser-board 120 is provided with plates 121, through which are the holes 122 for the sprue-heads to enter, and the pawl 123 is held in engagement with the notches 119 by springs 124, which are operated by push-levers 125. When these kind of sprues are used, they are set in the sand, and after the mold is completed the sprues are withdrawn automatically when the presser-board 120 is raised. The means whereby these frames are brought into position for compressing the sand is as follows, (see Fig. 5:) Into the head 110 on the shaft 107 are cut notches 126, into which the stop 127 of the pawl 102 meshes and stops further rotation of the shaft 107. The crank-arm 103 is pivoted to the sleeve 98 and carries upon its outer end the pawl 128, adapted to engage with the notches 129 in the head 110. For the purpose of bringing this pawl 128 always into engagement with the notches 129 a spring 130 is coiled around the right-angle extremity of the arm 103, with one end fixed in said arm and the other fixed in pawl 128. For the purpose of conveniently operating the pawl 128 there is pivoted to the arm 103 a pitman 131, the lower end of which is cushioned in its action by a spring 132. In each standard, near the top, is a strap 133 to also limit the backward movement of the presser-head.

It will be understood that the manner of operating the presser-head by its mechanism, just described, is as follows: The operator draws the presser-bar forward, bringing the head 112 into position over the drag, Fig. 5. By this action the pitman 131 pushes the crank-arm 103, carrying with it the pawl 128, into the position shown in the second position of Fig. 5. When the peening-head 112 has been used, the presser-frame drops back of its own accord into the first position. (Shown in Fig. 5.) In so doing the pawl 128 passes under the projection 134 of the pawl 102, lifting it out of engagement with the notches 126 in the head 110, allowing the presser-head to revolve one-third around, when the stop 127 of the pawl 102 drops into the next notch 126 in the head 110 and stops further rotation, at which time the head 113 has been brought into the position formerly occupied by the head 112. The same operation will bring the presser-head 114, with the sprues, into the position of the head 113.

Figure 17:
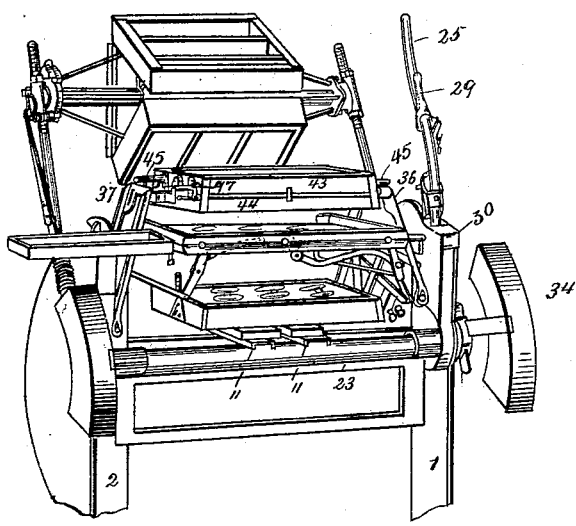
Figure 19:
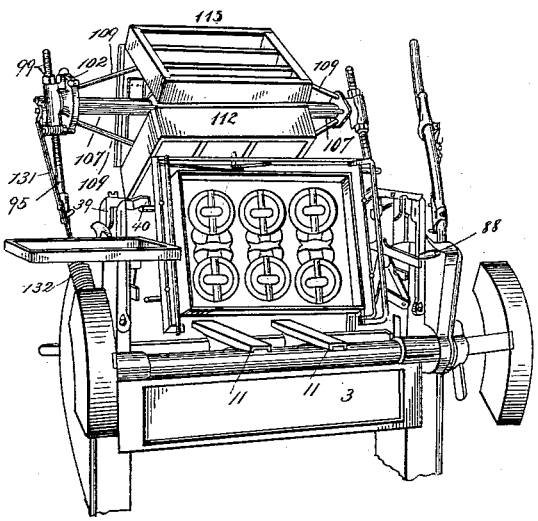

The operation of my device is as follows: The sand is made in a windrow on the side of the track, on which the machine is moved from time to time as desired. Commencing with the machine in the position shown in Fig. 1, the operator grasps the lever 25 around the latch-handle 29 and draws it forward, which raises the table until it comes in contact with the flask. The catch-lever 47 at the end of the flask is then pushed back with the left hand, withdrawing pawls 51 from engagement with pins 48 and unlocking the flask, when the lever 25 is reversed, lowering the table and separating the parts of the flask. The handle 88 is then raised with the left hand, bringing the pattern into position between the separated parts of the flask, as shown in Fig. 17. Upon again drawing the lever 25 forward the table, with the lower part of the flask, is raised until it comes in contact with the pattern-plate, when it raises the pattern-plate and with it the pattern-frame, lifting the trunnions 55 out of their open-top bearings 65 and 76 in the pattern-carrier, until the plate in turn comes in contact with the cope part of the flask, when with the left hand the operator throws back the support-arms 36 and 37 and pulls forward the catch-lever 47, which locks the two parts of the flask together, with the pattern-plate secured between. When the table is again lowered, the pattern-frame, flask, and all descend until the trunnions on the pattern-frame rest in their respective bearings 65 76, and the table descends to its lowest position. The pattern-frame, with the two parts of the flask attached, one on each side of the pattern-plate, is now easily turned over on the trunnions, as shown in Fig. 19, bringing the drag part of the flask up. On the lever 25 being drawn forward to the stop 30 the flask will be in position to fill the drag part with sand. The flask is then filled "heaping full" of loose sand, and the presser-bar is drawn forward, bringing the drag peening-head 112 directly over the flask and the hooks 96 and 97 on the lower end of the uprights 95 and 94 into engagement with the projections 86 on the upper ends of the standards 1 and 2. Then as the operator brings down the lever 25 and throws his weight thereon the flask will be forced up around the peening-head 112 (which head cannot be carried higher, because held by the hooks 96 and 97 in engagement with the projections 86) and compresses the sand firmly around the outer edge of the flask, but not in the center at all unless certain parts require greater density. At the time the sand is being compressed in the flask the hand-lever 25, with the other leverage mechanism, will assume the position shown by dotted lines in Fig. 3, where it will be seen that when the chains 18 begin to wrap around the hubs 26 the presser-power thereafter will remain constant, neither increasing nor decreasing, there being no dead-center. The condition of the sand in the flask after it has been compressed by head 112 will be seen by reference to Fig. 21. The presser-frame is then pushed back, by which act it is revolved, as before described, one third and brings the head 113 into the position formerly occupied by head 112, and the table is lowered to its lowest limits and the surplus sand "struck off" even with the top of the flask, filling all of the indentations made by the head 112. The bottom board is now put in place and secured by the clamps 56, when the frame, flask, and all are rolled over on the trunnions, as shown in Fig. 20, bringing the cope part of the flask up and the drag down and the sand held in the drag by the bottom board and said clamps. The table is again raised until the lever catches at 30, when the catch-levers 47 are turned inwardly, and the cope part of the flask is ready to be filled with sand. It will be observed that the operation of pushing the catch-levers 47 inwardly draws the pawls 51 out of engagement with the ratchets 50 on the pins, as shown in Figs. 8 and 9, and also throws the retaining-ribs 46 into the flask, as shown in Figs. 14 and 15. The object of these ribs 46 is to prevent the sand from sliding out of the cope (after having been pressed) when the flask is separated, as will hereinafter be explained. When the cope is filled with sand, the presser-frame is again brought forward and the operator's weight is brought to bear upon the lever 25, the sand around the edge and other necessary places in the cope side are pressed hard, and the sand in drag side is pressed less dense at the same time, because the bottom board covers the entire surface of the flask in the drag side, while the peening-frame 113 presses the sand at only a narrow margin around the edge and narrow strip or strips across the center. The table is again lowered, the presser-frame thrown back, and the surplus sand struck off from the top of the cope and the presser-frame again brought up, bringing with it this time the presser-head 114, carrying the round sprue-cutters. The weight of the operator is applied for the third time to the lever 25, when the sand in the cope is packed to the proper density, and at the same time the sprue-holes are cut, as shown in Fig. 16. When the mold is under pressure, the swing-arm 116, connected to the tubular sprue-cutters, is moved, which partly rotates the sprues and aids them in cutting round holes entirely through the cope to the pattern-plate. Without this rotating the sprue-cutters would not at all times cut through to the pattern, but would leave some sand sticking in the bottom of the hole on the pattern. The lever 25 is again reversed till it comes to the stop 30 and the presser-bar thrown back, when again it makes a third of a revolution, bringing the drag peening-frame 112 in position to be used on the next mold. The mold has now been properly pressed and the sprue-holes cut. The next part of the operation is to separate the two parts of the mold and withdraw the pattern. (See Fig. 17.) The swinging supports 36 and 37 are now swung inwardly, bringing the plates 40 and 41 under the pins 45 of the flask. If the pattern is such that it is difficult to draw, the operator takes a mallet in the left hand and raps the pattern-frame, while with the right hand he releases the catch on the lever from the stop 30 and allows the table to descend slowly. The cope is prevented from following the table by the pins 45 coming in contact with the supports 36 and 37. The pattern-plate and the drag will continue downward with the table till the trunnions 55 on the pattern-plate rest in their bearings 65 and 76, when it is arrested from a further descent, but the drag continues down with the table to its lowest point. It will be observed that the simple lowering of the table separates the mold and draws the pattern from both parts of the mold, leaving it suspended about midway between the separated parts of the mold, as shown in Fig. 17. By lowering the lever 88 the pattern-frame, with the pattern, is thrown out to the rear of the machine from between the separated parts of the mold.

Figure 18:
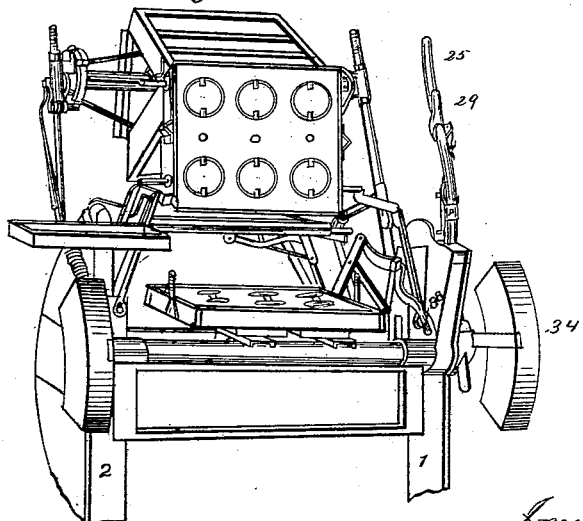
Figure 22:
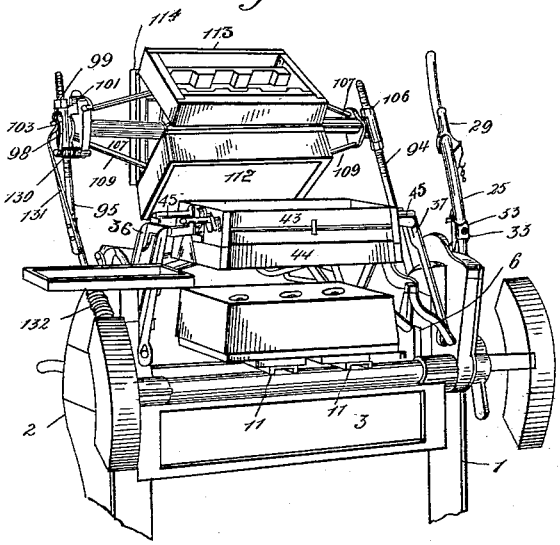

If the work is of such a character that cores are to be set, the cope may be rolled back, as shown in Fig. 18, and the cores placed in position. The lever 25 is now drawn forward, which raises the table and closes the mold accurately. The catch-levers 47 are pulled forward, which locks the two parts of the flask together and at the same time turns the semicircular retaining-ribs 46 back flush with the inside of the flask, which releases the part of the mold in the cope. Then as the table is again lowered the completed mold slides out of the flask, which flask is held suspended by the stop-arms 36 and 37 engaging the pins 45 of the cope part of the flask, leaving the completed mold resting upon the table, as shown in Fig. 22, and in easy reach to be laid on the floor.

If flat sprues are used, the operation is changed somewhat after the drag part has been finished and the cope part turned up. The flat-sprue pattern (shown in Figs. 10 and 11) which is held in the cope presser-head is released by pressing the spring-catch 125, and the pins on the lower end of the sprue are fitted into holes in the pattern-plate adapted to hold the sprue upright. The peening and pressing operations proceed as before; but instead of the sprue cutting its way through the sand the flat sprue is pressed into the opening 122 in the presser-board 120, when the head of the sprue is caught by the pawl 123, and when the lever is reversed and the mold recedes from the presser-head the sprue is drawn out of the mold.

Of course it is understood that any number of either flat, round, or other shape sprues may be used, according to the work to be done.

It will also be understood that various modifications in the manner of construction of my machine may be made by one skilled in the art to which it appertains, and hence I do not limit myself to the precise mode of construction shown; but What I desire to secure by Letters Patent is—

1. A flask for molding-machines, having a cope and drag, a guide 48, attached to the end of the drag, a socket 49, in the end of the cope and a lubricating-pad C, within the socket 49, for lubricating the guide when the parts of the flask are brought together and separated, as described.

2. A flask made in two parts and tapering vertically, the ribs 46, placed in grooves in the side of the flask, the levers 47 connected to the ends of the ribs, one of which is provided with an eccentric for operating the lock for holding the two parts of the flask together, combined with the pins 48 placed upon the drag, and provided with the ratchets, the sockets 49 secured to the cope, the pawls 51, and the links 52, which are operated by the eccentric substantially as shown.

3. In a molding-machine, a flask made in two parts, and which has a rising and a falling movement and tapering inwardly from bottom to top, a locking device for holding the two parts of the flask together, retaining-ribs for retaining the mold in the cope of the flask and releasing it therefrom, and means for raising and lowering the flask, stops for arresting the descent and sustaining the flask, a table beneath said flask and leverage mechanism for operating the table, whereby, by withdrawing the ribs, locking the two parts of the flask and lowering the table, the completed mold is withdrawn from the flask and rests on the table, substantially as described and shown.

4. In a molding-machine, a pattern-frame, provided with trunnions, and a stop at one corner, and a pattern-plate carrying one or more patterns, combined with a clamp or loop at each end of the pattern-frame, the arms loosely connected at their outer ends to the clamps or loops, and a pivoted lever, connected to the inner ends of the arms, substantially as described.

5. In a molding-machine, the standards of the frame, catches secured to the upper ends thereof, and a vertically-moving table for supporting the flask, means for raising and lowering the table, combined with pivoted standards for supporting and moving the presser-frame, a horizontal pivot for the presser-frame connecting the upper ends of the pivoted standards, the presser-frame placed on the pivot and revolving thereon, presser-heads secured to the presser-frame, and hooks secured to the pivoted standards for engaging with the catches on the frame for limiting the movement of the pivoted standards, substantially as described.

6. In a molding-machine, the slotted standards, the slide 14 applied to the inner side of the standard and provided with the mortise 15, and the lugs 16 at its lower end, the bolt 17, the link or chain, and the nut 19, combined with the bar 20, placed in the standard, the link 21 connected to the chain at one end, the rocker-shaft arm 22 connected at its outer end to the upper end of the link, the rocker-shaft 23, the hub 26, the counter-balance 24 secured to the shaft and the table upon which the flask is placed, substantially as described.

7. In a molding-machine, a presser-head, one or more tubular sprue-cutters secured to said head, springs for cushioning the sprue-cutters, and a lever for partly rotating said sprue-cutters, whereby round sprue-holes are automatically cut in the mold, substantially as shown.

8. In a molding-machine, the slotted standards, apertured slides in the standards, a truss provided with lugs upon its ends, and which lugs extend through the slots in the standards, and fit in the apertured slides, a shaft provided with counter-weights, an operating-lever connected to the shaft, and arms projecting from the shaft, combined with rods connecting the lower ends of the rods and the slides; the operating-lever of the shaft being provided with an adjustable handle or lever at its outer end, substantially as shown.

9. In a molding-machine, a truss-table, tenons at the ends of the truss, guide-bars within the standards of the machine, slides adapted to partially encircle the guide-bars and connected to the tenons of the truss, to guide the vertical motion of the table, telescopic shields inclosed in recesses in the standards, adapted to move up and down with the truss to protect from sand all inclosed within the standards of the machine and leverage mechanism connected with said slides for operating the table, substantially as and for the purposes shown.

10. In a molding-machine, a leverage mechanism for operating the table to compress the sand in the flask, consisting of a shaft, with hub secured thereto, a lever secured to the hub, an arm attached to the hub and flexible connections between the outer end of the arm and the table, whereby the rotation of the hub forward transmits a decrease of motion and an increase of power to the table till the flexible link commences to wrap around the hub when thereafter both the motion and power remain constant for the purposes shown.

11. In a molding-machine, the standards, the flask, made in two parts, the pattern within the flask, and a table upon which the flask is placed, combined with a counter-weighted partially-revolving shaft, provided with an arm 22, a rod 21 pivotally attached to the outer end of the arm 22, the standards carrying the flask-supporting table, the slides 14, secured to the outer side of the standard and supporting the table, the chain 18 connecting the ends of the rods 21 to the slides 14, the operating-lever for moving the shaft, the pawl placed upon the lever, a hand-latch for bringing the pawl into engagement, the stop 30 upon the standard, the spring 31 placed upon the pawl, and the arm 33 carrying a pawl made adjustable upon the lever, substantially as described.

In testimony whereof I affix my signature in the presence of two witnesses.

FAY O. FARWELL.

Witnesses:
   M. M. CADY,
   J. E. ROSSER.